United States Patent
Kim et al.

(10) Patent No.: US 8,411,802 B2
(45) Date of Patent: *Apr. 2, 2013

(54) ITERATIVE ESTIMATOR AND METHOD OF CHANNEL AND NOISE VARIANCE FOR MULTIPLE INPUT MULTIPLE OUTPUT ORTHOGONAL FREQUENCY DIVISION MULTIPLEXING SYSTEM

(75) Inventors: Seong Rag Kim, Daejeon (KR); Junyoung Nam, Daejeon (KR); Hyun Kyu Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 286 days.

This patent is subject to a terminal disclaimer.

(21) Appl. No.: 12/809,056

(22) PCT Filed: Dec. 4, 2008

(86) PCT No.: PCT/KR2008/007161
§ 371 (c)(1),
(2), (4) Date: Jun. 17, 2010

(87) PCT Pub. No.: WO2009/078603
PCT Pub. Date: Jun. 25, 2009

(65) Prior Publication Data
US 2011/0158302 A1    Jun. 30, 2011

(30) Foreign Application Priority Data
Dec. 17, 2007 (KR) .................. 10-2007-0132202

(51) Int. Cl.
*H04L 27/06* (2006.01)

(52) U.S. Cl. ........ 375/340; 375/260; 375/316; 375/346; 455/63.1; 455/67.13; 455/114.2; 455/296; 455/501; 370/210; 370/335; 370/342; 370/344; 370/480; 327/551

(58) Field of Classification Search .................. 375/260, 375/316, 340, 346; 455/63.1, 67.13, 114.2, 455/296, 501; 370/210, 335, 342, 344, 480; 327/551
See application file for complete search history.

(56) References Cited

U.S. PATENT DOCUMENTS

| | | | |
|---|---|---|---|
| 6,985,434 B2* | 1/2006 | Wu et al. ........................ | 370/208 |
| 7,239,672 B2* | 7/2007 | Su .................................. | 375/316 |
| 7,957,483 B2* | 6/2011 | Yu et al. ......................... | 375/267 |
| 2007/0064831 A1* | 3/2007 | Bjerke et al. .................. | 375/267 |

FOREIGN PATENT DOCUMENTS

| | | |
|---|---|---|
| JP | 2004-166218 A | 6/2004 |
| JP | 2005-252602 A | 9/2005 |

(Continued)

OTHER PUBLICATIONS

Jong-Ho Lee et al., Pilot Symbol Initiated Iterative Channel Estimation and Decoding for QAM Modulated OFDM Signals, VTC 2003, pp. 1322-1326.

(Continued)

*Primary Examiner* — Leon Flores
(74) *Attorney, Agent, or Firm* — Rabin & Berdo, P.C.

(57) ABSTRACT

A reception apparatus including: a detection unit detecting extrinsic information based on an output of a tentative symbol decision unit, an output of a channel estimation unit, and an output of a noise variance estimation unit that are obtained from a previous iteration process; a Cyclic Redundancy Check (CRC) aided channel decoding unit outputting an encoded and interleaved bit, or a posteriori information thereof based on the extrinsic information; the tentative symbol decision unit determining a tentative transmission symbol based on an output of the CRC aided channel decoding unit; the channel estimation unit estimating a channel based on an output of the tentative symbol decision unit or a pilot symbol; and the noise variance estimation unit estimating a noise variance or an initial noise variance based on the output of the tentative symbol decision unit and the output of the channel estimation unit is provided.

13 Claims, 7 Drawing Sheets

FOREIGN PATENT DOCUMENTS

JP 2006-333419 A 12/2006
KR 2004-0027153 A 4/2004

OTHER PUBLICATIONS

Koichi Adachi et al., Iterative QRM-MLD with Pilot-Assisted Decision Directed Channel Estimation for OFDM MIMO Multiplexing, IEICE Trans. Fundamentals, vol. E89-A, No. 7 Jul. 2006, pp. 1892-1902.

Michele Morelli et al., A comparison of pilot-aided channel estimation methods for OFDM systems, IEEE Transactions on Signal Processing, vol. 49, No. 12, Dec. 2001, pp. 3065-3073.

* cited by examiner

ITERATIVE ESTIMATOR AND METHOD OF CHANNEL AND NOISE VARIANCE FOR MULTIPLE INPUT MULTIPLE OUTPUT ORTHOGONAL FREQUENCY DIVISION MULTIPLEXING SYSTEM

TECHNICAL FIELD

The present invention relates to an iterative transmission/reception apparatus and method for improving the performance associated with channel estimation and noise variance estimation and reducing the complexity in a Multiple-Input Multiple-Output (MIMO) orthogonal frequency division multiplexing (OFDM) system.

This work was supported by the IT R&D program of MIC/IITA. [2006-S-001-02, Development of Adaptive Radio Access and Transmission Technologies for 4th Generation Mobile Communications]

BACKGROUND ART

Generally, compared to a scheme of directly estimating a frequency domain channel in a received signal, a Multiple-Input Multiple-Output (MIMO) orthogonal frequency division multiplexing (OFDM) system initially estimates a time domain channel and then finally estimates a frequency domain channel using the estimated time domain channel. The MIMO OFDM system can reduce the noise affect and also can effectively perform interpolation between pilot subcarriers to improve the channel estimation performance. Channel estimation schemes can be generally classified into a disjoint channel estimation scheme and joint channel estimation scheme.

The disjoint channel estimation scheme considers, as interference, other signals except for its own signal to estimate a channel. For example, on the assumption that a number of multi-paths of a time domain channel is P, when the conventional disjoint channel estimation is adopted, P×P matrix inversion is required for each OFDM symbol.

On the assumption that a number of transmit antennas is $N_t$, the joint channel estimation scheme simultaneously estimates channels corresponding to all the transmit antennas. Therefore, $$N_t P \times N_t P$$

matrix inversion is required for each OFDM symbol. Generally, since P>50, it is very difficult to embody the joint channel estimation scheme. In the conventional art, proposed was a scheme of canceling an interference component, caused by another antenna, using interference estimation obtained from an iterative reception process to improve the channel estimation performance. However, since the conventional scheme does not adopt a time domain channel estimation process, the performance may be significantly deteriorated when frequency selectivity or time selectivity is large.

When mixing the conventional schemes, the performance of mixed scheme can be similar to the performance of the joint channel estimation scheme and the complexity thereof may be similar to the complexity of the disjoint channel estimation scheme. However, since the mixed scheme also requires P×P matrix inversion for each OFDM symbol, there still remains a problem that the complexity thereof is very high.

In the case of an initial channel estimation scheme of estimating a channel using a pilot symbol, a channel estimation value in a previous iteration for interference cancellation does not exist and thus the interference cancellation becomes impossible. Specifically, the only solution is to apply the conventional joint channel estimation scheme.

In the case of a conventional noise variance estimation scheme, when per-subcarrier estimation is performed, the performance can be deteriorated due to a noise component.

DISCLOSURE OF INVENTION

Technical Problem

An aspect of the present invention provides a transmission/reception apparatus and method that can adopt a channel estimation scheme with similar performance to a joint channel estimation scheme and with lower complexity due to not requiring a matrix inversion, in a Multiple-Input Multiple-Output (MIMO) orthogonal frequency division multiplexing (OFDM) system.

Another aspect of the present invention also provides a transmission/reception apparatus and method that can perform soft interference cancellation based on a value estimated in a previous OFDM symbol, in an initial channel estimation stage and thereby can improve the channel estimation performance and reduce the complexity.

Another aspect of the present invention also provides a transmission/reception apparatus and method that can improve the performance of interference noise variance estimation based on all the information associated with previous effective subcarriers when estimating noise variance in a MIMO OFDM system.

Technical Solution

According to an aspect of the present invention, there is provided a transmission apparatus including: an encoding unit encoding a transmission packet; an interleaving unit interleaving the encoded transmission packet; a mapping unit mapping the interleaved transmission packet; a pilot insertion unit inserting a pilot symbol and an information symbol into a subcarrier of the mapped transmission packet; and a transmit antenna transmitting the transmission packet with the inserted pilot symbol and information symbol.

According to another aspect of the present invention, there is provided a reception apparatus including: a detection unit detecting extrinsic information based on an output of a tentative symbol decision unit, an output of a channel estimation unit, and an output of a noise variance estimation unit that are obtained from a previous iteration process; a Cyclic Redundancy Check (CRC) aided channel decoding unit outputting an encoded and interleaved bit, or a posteriori information thereof based on the extrinsic information; the tentative symbol decision unit determining a tentative transmission symbol based on an output of the CRC aided channel decoding unit; the channel estimation unit estimating a channel based on an output of the tentative symbol decision unit; and the noise variance estimation unit estimating a noise variance or an initial noise variance based on the output of the tentative symbol decision unit and the output of the channel estimation unit.

According to still another aspect of the present invention, there is provided a transmission method including: encoding a transmission packet; interleaving the encoded transmission packet; mapping the interleaved transmission packet; inserting a pilot symbol and an information symbol into a subcarrier of the mapped transmission packet; and transmitting the transmission packet with the inserted pilot symbol and information symbol.

According to yet another aspect of the present invention, there is provided a reception method including: detecting extrinsic information based on a tentative symbol decision, a channel estimation, and a noise variance estimation that are obtained from a previous iteration process; outputting an encoded and interleaved bit or a posteriori information thereof based on the extrinsic information; determining a tentative transmission symbol based on the outputting; estimating a channel based on a tentative symbol decision; and estimating a noise variance or an initial noise variance based on the tentative symbol decision and the channel estimation.

MODE FOR THE INVENTION

Reference will now be made in detail to embodiments of the present invention, examples of which are illustrated in the accompanying drawings, wherein like reference numerals refer to the like elements throughout. The embodiments are described below in order to explain the present invention by referring to the figures.

Hereinafter, an iterative transmission/reception apparatus and method for a Multiple-Input Multiple-Output (MIMO) orthogonal frequency division multiplexing (OFDM) system will be described in detail with reference to the accompanying drawings. For example, the present invention will be described based on the MIMO OFDM system with $N_t$ transmit antennas and $N_r$ receive antennas. Here, a total number of subcarriers is N in which $N_c$ subcarriers are used to substantially transmit data and $N-N_c$ subcarriers are not used. Among the $N_c$ effective subcarriers, $N_p$ subcarriers are allocated to a pilot symbol and remaining subcarriers are allocated to an information symbol. $N_t$ pilot symbols transmitted from all the transmit antennas are overlappingly transmitted to a single pilot subcarrier.

Figure 1:
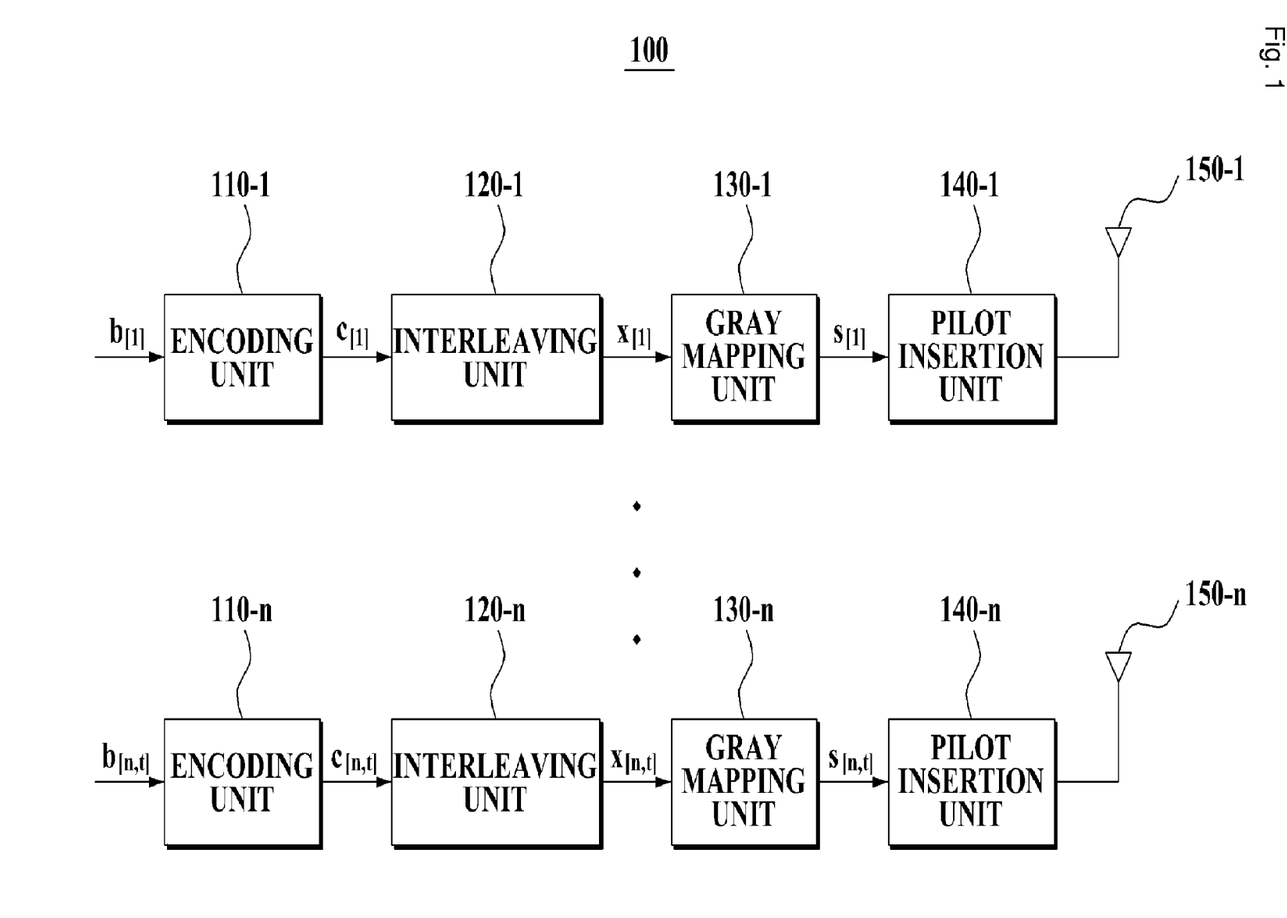
FIG. 1 is a block diagram illustrating a configuration of a transmission apparatus in a Multiple-Input Multiple-Output (MIMO) orthogonal frequency division multiplexing (OFDM) system according to an embodiment of the present invention.

FIG. 1 is a block diagram illustrating an iterative transmission apparatus 100 for a MIMO OFDM system according to an embodiment of the present invention.

Referring to FIG. 1, the iterative transmission apparatus 100 for the MIMO OFDM system includes encoding units 110-1, . . . , 110-n, interleaving units 120-1, . . . , 120-n, Gray mapping units 130-1, . . . , 130-n, pilot insertion units 140-1, . . . , 140-n, and transmit antennas 150-1, . . . , 150-n.

Specifically, the transmission apparatus 100 is in the horizontal encoding structure and transmits a different bit stream or packet for each of the transmit antennas 150-1, . . . , 150-n.

The encoding units 110-1, . . . , 110-n may receive and encode information bit streams b to output encoded bit streams c, respectively. Also, the encoding units 110-1, . . . , 110-n may receive and encode a transmission packet to output encoded transmission packets. Specifically, the information bit streams b may be converted to the encoded bit streams c via the encoding units 110-1, . . . , 110-n, respectively. The transmission packets may be converted to the encoded transmission packets via the encoding units 110-1, . . . , 110-n, respectively.

The independency between coded bits should be secured for appropriate operations of the transmission apparatus 100. For this, the interleaving units 120-1, . . . , 120-n may receive and interleave the encoded bit streams c to output interleaved bit streams x, respectively. Specifically, the encoded bit streams c may be converted to the interleaved bit streams x via the interleaving units 120-1, . . . , 120-n, respectively. The interleaving units 120-1, . . . , 120-n may receive and interleave the encoded transmission packets to output interleaved transmission packets.

The Gray mapping units 130-1, . . . , 130-n may receive and perform Gray mapping for the interleaved bit streams x to output information symbols s, respectively. Specifically, an Mc number of interleaved bit streams x may be converted to the information symbols s via the Gray mapping units 130-1, . . . , 130-n, respectively. The Gray mapping units 130-1, . . . , 130-n may receive and perform Gray mapping for the interleaved transmission packets to output mapped transmission packets.

The pilot insertion units 140-1, . . . , 140-n may insert $N_p$ pilot symbols into subcarriers $$p_1, p_2, \ldots, p_N,$$

and insert $$N_c - N_p$$

information symbols into the subcarriers with the inserted pilot symbols to generate a packet consisting of $N_c$ symbols. For example, subscript[k] in b[k] denotes a bit stream to be transmitted via a $k^{th}$ transmit antenna 150-k.

$$s_{n,j}$$

is defined as a symbol that is transmitted to a $j^{th}$ transmit antenna 150-j via an $n^{th}$ subcarrier.

$$y_{n,i}$$

is defined as a signal that is received at an $i^{th}$ receive antenna via the $n^{th}$ subcarrier. In this case, in the MIMO OFDM system with $N_c$ effective subcarriers, received signal vector $$y_n = [y_{n,1}\ y_{n,2} \cdots y_{n,N_r}]^T$$

of the $n^{th}$ subcarrier may be expressed as, $$y_n = H_n s_n + v_n, n=1, 2, \ldots, N_c, \qquad \text{[Equation 1]}$$

where $$s_n = [s_{n,1}\ s_{n,2} \cdots s_{n,N_t}]^T$$

denotes a transmission symbol vector, $$v_n = [v_{n,1}\ v_{n,2} \cdots v_{n,N_r}]^T$$

denotes a noise signal vector, $$CN(0, R_{n,vv})$$

denotes a Gaussian probability density function, and $$R_{n,vv}=E\{v_n^H v_n\}=s_n^2 I_{N_r}.$$

A MIMO channel of a frequency domain of the $n^{th}$ subcarrier may be defined as given by, $$H_n = \begin{bmatrix} h_{n,11} & h_{n,12} & \cdots & h_{n,1N_t} \\ h_{n,21} & h_{n,22} & \cdots & h_{n,2N_t} \\ \vdots & \vdots & \ddots & \vdots \\ h_{n,N_r 1} & h_{n,N_r 2} & \cdots & h_{n,N_r N_t} \end{bmatrix},$$ [Equation 2]

where $h_{n,ij}$ denotes a channel coefficient of the frequency domain of the $n^{th}$ subcarrier between the $j^{th}$ transmit antenna and the $i^{th}$ receive antenna.

Figure 2:
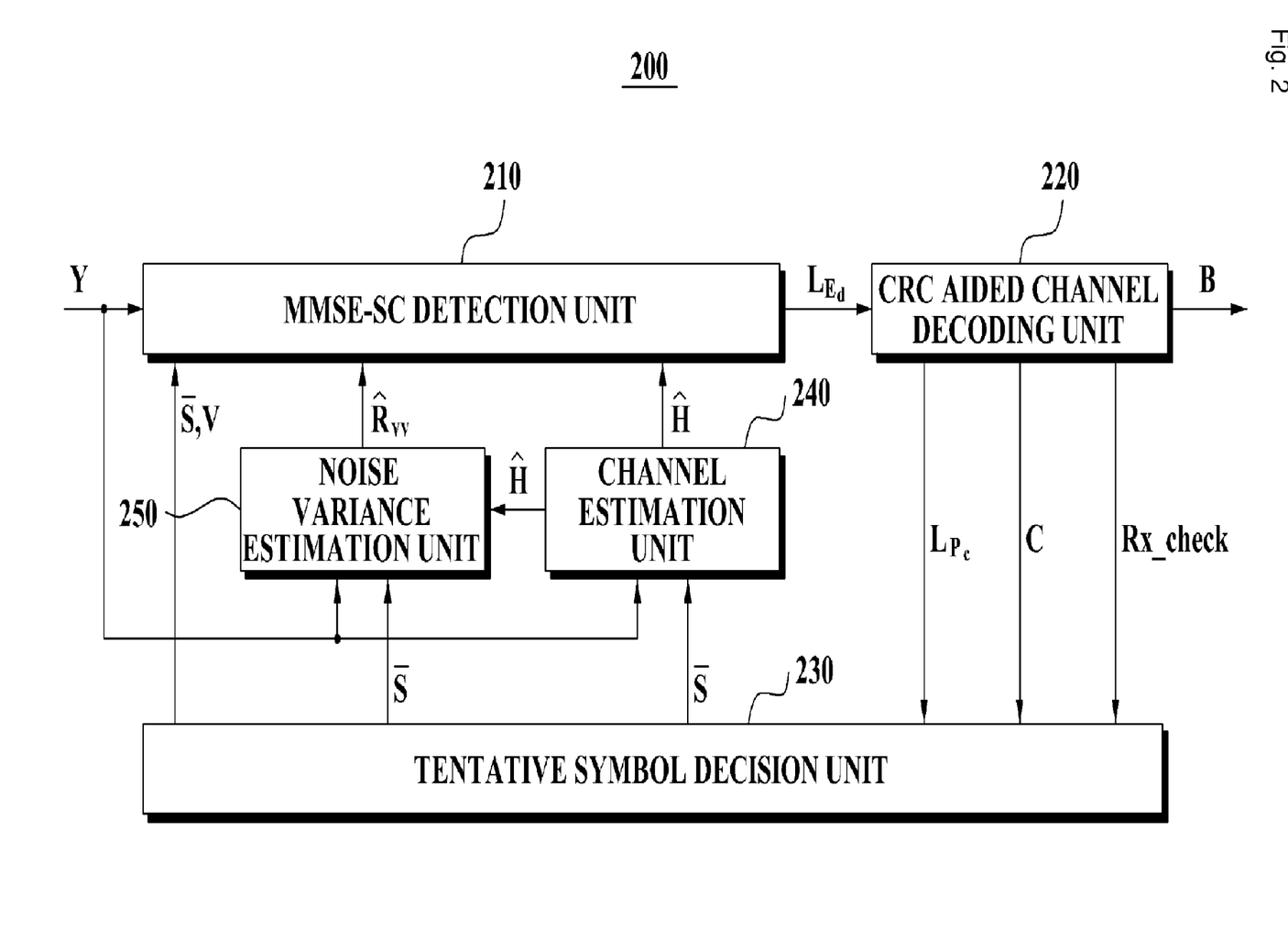
FIG. 2 is a block diagram illustrating a configuration of a reception apparatus in a MIMO OFDM system according to an embodiment of the present invention.

FIG. 2 is a block diagram illustrating a configuration of a reception apparatus 200 in a MIMO OFDM system according to an embodiment of the present invention.

Referring to FIG. 2, the reception apparatus 200 includes a minimum mean squared error with soft cancellation (MMSE-SC) detection unit 210, a Cyclic Redundancy Check (CRC) aided channel decoding unit 220, a tentative symbol decision unit 230, a channel estimation unit 240, and a noise variance estimation unit 250.

The MMSE-SC detection unit 210 may output bit extrinsic LLR $L_{E_d}^{(q+1)}$ of a per-antenna interleaved bit stream to the CRC aided channel decoding unit 220.

Hereinafter, a configuration and operation of the CRC aided channel decoding unit 220 will be further described in detail with reference to FIG. 3.

Figure 3:
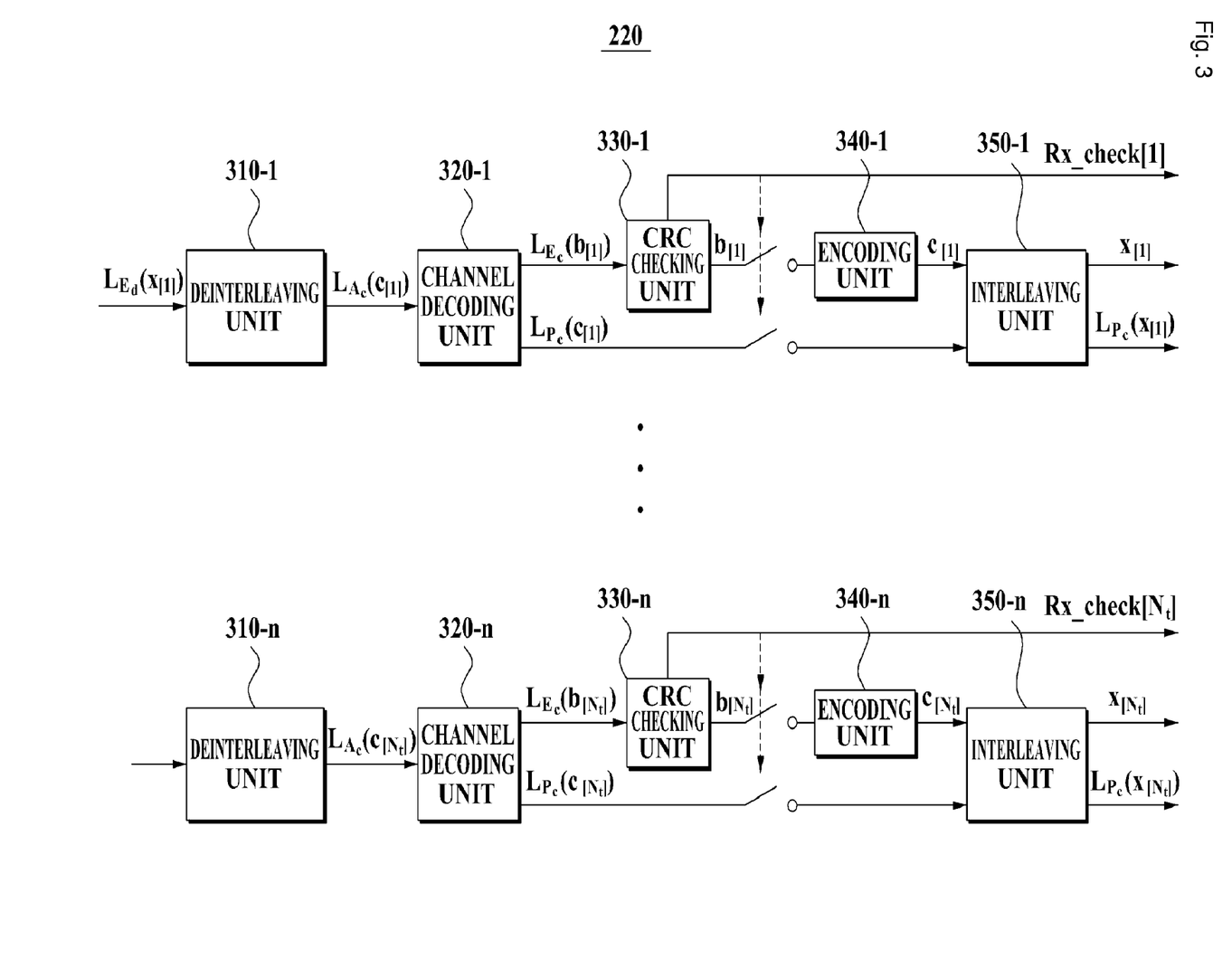
FIG. 3 is a block diagram illustrating a configuration of a Cyclic Redundancy Check (CRC) aided channel decoding unit shown in FIG. 2.

FIG. 3 is a block diagram illustrating a configuration of the CRC aided channel decoding unit 220 shown in FIG. 2.

Referring to FIG. 3, the CRC aided channel decoding unit 220 includes a deinterleaving units 310-1, ..., 310-n, channel decoding units 320-1, ..., 320-n, CRC checking units 330-1, ..., 330-n, encoding units 340-1, ..., 340-n, and interleaving units 350-1, ..., 350-n.

The CRC aided channel decoding unit 220 may receive bit extrinsic LLR $L_{E_d}^{(q+1)}$ from the MMSE-SC detection unit 210 to generate a priori LLR $L_{A_c}^{(q+1)}$ of the channel decoding units 320-1, ..., 320-n via the deinterleaving units 310-1, ..., 310-n.

The channel decoding units 320-1, ..., 320-n may calculate transmission information bit extrinsic LLR $L_{E_c}^{(q+1)}$ using the a priori LLR $L_{A_c}^{(q+1)}$ to output the calculated transmission information bit extrinsic LLR $L_{E_c}^{(q+1)}$ to the CRC checking units 330-1, ..., 330-n.

The CRC checking units 330-1, ..., 330-n may perform CRC check for the transmission information bit extrinsic LLR $L_{E_c}^{(q+1)}$ to determine whether an error has occurred while receiving a packet. Specifically, when it is determined no error has occurred while receiving the packet, the CRC checking units 330-1, ..., 330-n may set Rx_check to "1" and close an upper switch to thereby encode corresponding received information bits via the encoding units 340-1, ..., 340-n and output the encoded corresponding received information bits to the interleaving units 350-1, ..., 350-n, respectively. For example, when it is determined an error has occurred, the CRC checking units 330-1, ..., 330-t may set Rx_check to "0" and close a lower switch to generate a posteriori LLR $L_{P_c}^{(q+1)},$ output from the channel decoding units 320-1, ..., 320-n, as a priori LLR $L_{A_d}^{(q+1)}$ of the tentative symbol decision unit 230 via the interleaving units 350-1, ..., 350-n. The upper switch may be switched so that an output of the CRC checking units 330-1, ..., 330-n may be transferred to the encoding units 340-1, ..., 340-n according to the reception error check signal Rx_check. The lower switch may be switched so that an output of the channel decoding units 320-1, ..., 320-n may be transferred to the interleaving units 350-1, ..., 350-n according to the reception error check signal Rx_check.

The channel decoding units 320-1, ..., 320-n may output a posteriori LLR $L_{P_c}^{(q+1)}$ of a coded bit, which becomes a priori LLR $L_{A_d}^{(q+1)}$ of the tentative symbol decision unit 230 via the interleaving units 350-1, ..., 350-n.

The tentative symbol decision unit 230 may determine tentative symbol $\overline{s}^{(q+1)}$ based on an output of the CRC aided channel decoding unit 220. Specifically, the tentative symbol decision unit 230 may tentatively determine the transmission symbol based on the output of the CRC aided channel decoding unit 220. Hereinafter, a configuration and operation of the tentative symbol decision unit 230 will be described in detail with reference to FIG. 4.

Figure 4:
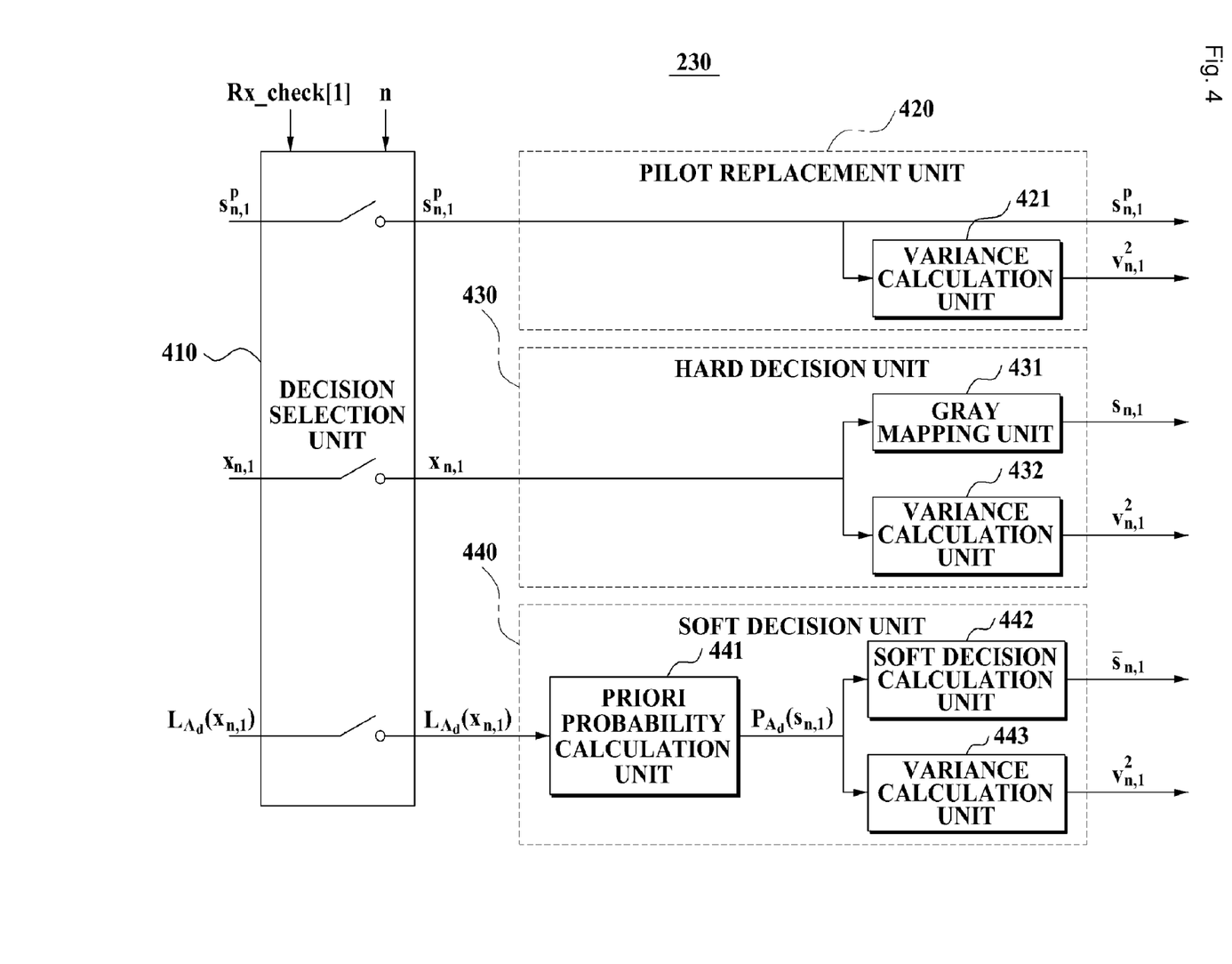
FIG. 4 is a block diagram illustrating a configuration of a tentative symbol decision unit shown in FIG. 2.

FIG. 4 is a block diagram illustrating a configuration of the tentative symbol decision unit 230 shown in FIG. 2.

Referring to FIG. 4, the tentative symbol decision unit 230 includes a decision selection unit 410, a pilot replacement unit 420, a hard decision unit 430, and a soft decision unit 440.

The decision selection unit 410 may select a tentative decision scheme based on Rx_check and a subcarrier index n. For example, the decision selection unit 410 may select any one decision scheme from three tentative symbol decision schemes based on Rx_check and the subcarrier index n.

When a transmission symbol is determined as a pilot symbol as a result of checking the subcarrier index n, the pilot replacement unit 420 may replace tentative symbol decision $$\bar{s}_{n,k}^{(q+1)}$$

of $s_{n,k}$ with pilot symbol $s_{n,k}^P$.

Specifically, $$\bar{s}_{n,k}^{(q+1)} = s_{n,k}^P.$$

A variance calculation unit 421 may calculate variance of the tentative symbol decision $\bar{s}_{n,k}^{(q+1)}$.

The variance of the tentative symbol decision $$\bar{s}_{n,k}^{(q+1)}$$

is $$\text{var}\{s_{n,k}^{(q+1)}\} = 0.$$

Also, when the transmission symbol is determined as an information symbol as the result of checking the subcarrier index n and Rx_check is "1", the hard decision unit 430 may perform Gray mapping for an interleaved bit, received without causing any error, via a Gray mapping unit 431 to generate tentative symbol decision $\bar{s}^{(q+1)}$.

Specifically, $\bar{s}^{(q+1)} = s$.

Also, the hard decision unit 430 calculates variance of the errorlessly received interleaved bit via a variance calculation unit 432. The variance of $\bar{s}_{n,k}^{(q+1)}$ is $$\text{var}\{s_{n,k}^{(q+1)}\} = 0.$$

Also, when the transmission symbol is determined as the information symbol as the result of checking the subcarrier index n and Rx_check is "0", the soft decision unit 440 may calculate a bit probability and a symbol probability via a priori probability calculation unit 441. The bit probability may be calculated using a posteriori LLR $L_{P_c}^{(q+1)}(x)$ of channel decoding, as given by, $$p_{A_d}^{(q+1)}(x_{n,k,m}) = \frac{e^{\pm L_{P_c}^{(q+1)}(x_{n,k,m})}}{1 + e^{\pm L_{P_c}^{(q+1)}(x_{n,k,m})}}. \quad \text{[Equation 3]}$$

The symbol probability may be calculated as given by, $$p_{A_d}^{(q+1)}(s_{n,k}) = \prod_{m=1}^{M_c} p_{A_d}^{(q+1)}(x_{n,k,m}). \quad \text{[Equation 4]}$$

A soft decision calculation unit 742 may determine $\bar{s}^{(q+1)}$ and perform soft decision, as given by, $$\bar{s}_{n,k}^{(q+1)}(n) = \mathbb{E}\{s_{n,k}^{(q+1)}\} = \sum_{s_k \in \mathbb{S}} s_{n,k} p_{A_d}^{(q+1)}(s_{n,k}), \quad \text{[Equation 5]}$$

where $S_{n,j}$ is a total number of $2^{M_o}$ sets of $S_{n,j}$.

A variance calculation unit 443 may calculate symbol variance as given by, $$\text{var}\{s_{n,k}^{(q+1)}\} = \sum_{s_{n,k} \in S} |s_{n,k}^{(q+1)}|^2 p_{A_d}^{(q+1)}(s_{n,k}) - (\bar{s}_{n,k}^{(q+1)})^2. \quad \text{[Equation 6]}$$

Figure 5:
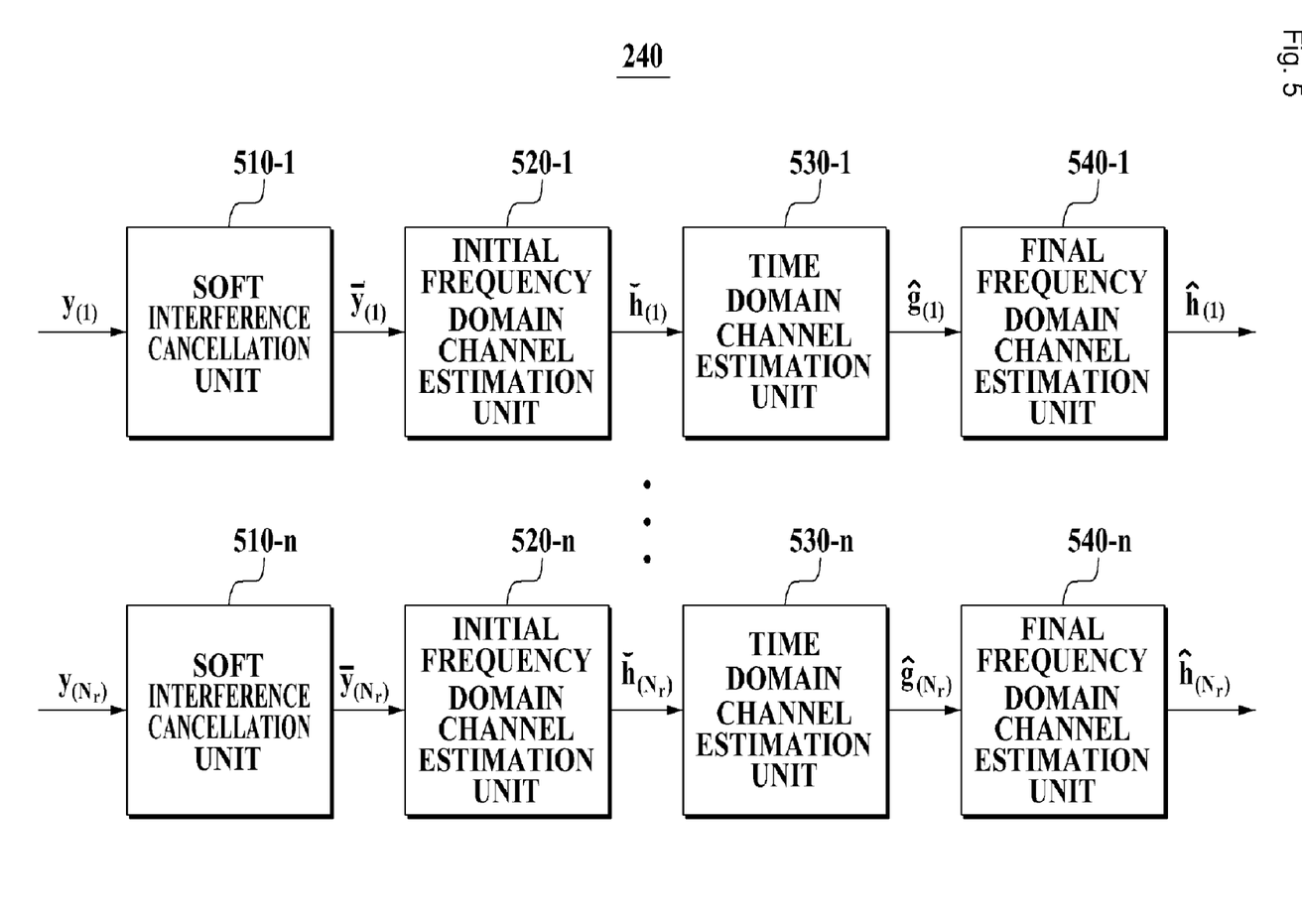
FIG. 5 is a block diagram illustrating a configuration of a channel estimation unit shown in FIG. 2.

FIG. 5 is a block diagram illustrating a configuration of the channel estimation unit 240 shown in FIG. 2.

Referring to FIG. 5, the channel estimation unit 240 includes soft interference cancellation units 510-1, ..., 510-n, initial frequency domain channel estimation units 520-1, ..., 520-n, time domain channel estimation units 530-1, ..., 530-n, and final frequency domain channel estimation units 540-1, ..., 540-n.

When a received signal vector for channel estimation is defined as $y_{(i)} = [y_{1,i} \, y_{2,i} \ldots y_{N_o,i}]^T$, it may be represented as, $$y_{(i)} = S_k h_{ik} + \sum_{j=1, j \neq k}^{N_t} S_j h_{ij} + v_{(i)}. \quad \text{[Equation 7]}$$

where $h_{ij} = [h_{1,ij} \, h_{2,ij} \ldots h_{N_o,ij}]^T$ $S_k = \text{diag}(s_{1,k}, s_{2,k}, \ldots, s_{N_o,k})$ $v_{(i)} = [v_{1,i} \, v_{2,i} \ldots v_{N_o,i}]^T$.

When $g_{P,ij}$ is defined as a channel impulse response (CIR) of the time domain with respect to a $p^{th}$ multi-path channel between a $j^{th}$ transmit antenna and a $j^{th}$ receive antenna, the channel relationship between the frequency domain and the time domain may be represented as, $$h_{n,ij} = \sum_{p=0}^{P-1} g_{p,ij} e^{-j2\pi pn/N_o}. \quad \text{[Equation 8]}$$

where

P denotes a number of multi-paths. When it is defined that $$g_{kj}=[g_{1,kj}\, g_{2,kj}\, \ldots\, g_{P,kj}]^T,$$

the relationship shown in the following Equation 9 may be established, $$h_{kj}=F_c g_{kj}, \quad \text{[Equation 9]}$$

where $$F_c \in \mathbb{C}^{N_o \times P}$$

denotes a discrete Fourier transform (DFT) matrix for the CIR and $$[F_c]_{n,p}=e^{-j2\pi(n-1)(p-1)/N}.$$

Generally, columns of $$F_c$$

are not orthogonal to each other and are given by, $$F_c^\dagger F_c = I_P, \quad \text{[Equation 10]}$$

where $$F_c^+$$

denotes a pseudo-inverse matrix of $$F_c.$$

Equation 9 and Equation 10 may be induced to make the relationship as given by, $$g_{kj}=F_c^\dagger h_{kj}. \quad \text{[Equation 11]}$$

Accordingly, Equation 7 may be represented as, $$y_{(i)} = S_k F_c^+ g_{ik} + \sum_{j=1, j\neq k}^{N_t} S_j F_c^+ g_{ij} + v_{(i)}. \quad \text{[Equation 12]}$$

A channel estimation scheme may be generally classified into a disjoint channel estimation scheme and a joint channel estimation scheme.

In a second item of Equation 12, the disjoint channel estimation scheme considers, as interference, signals transmitted to other transmit antennas, and estimates time domain channel $$g_{ik}$$

and then finally estimates frequency domain $$h_{kj}$$

using Equation 9.

The joint channel estimation scheme simultaneously estimates $$g_{ij}, j=1,2,L,N_t$$

of all the antennas. Therefore, $$N_r P \times N_t P$$

matrix inversion is required for each OFDM symbol.

Since an iterative receiver uses not only a pilot symbol for channel estimation but also a tentative decision value of an information symbol obtained from a previous iteration process, it is possible to improve the channel estimation performance. A representative example of iterative channel estimation is expectation and maximization (EM) channel estimation.

Generally, when a disjoint EM channel estimation scheme is used, it may be expressed as, $$\hat{h}_{ik}^{(q+1)}=F_c F_c^+ [F_c^+ (\overline{S}_k^{(q+1)})^H \overline{S}_k^{(q+1)} F_c + R_{vv}^{(q)} (R_{hh}^{(q+1)})^{-1}]^{-1} (\overline{S}_k^{(q+1)})^H y_{(i)}, \quad \text{[Equation 13]}$$

where $$\overline{S}_k^{(q+1)}$$

denotes an estimate of $$S_k$$

obtained by the tentative symbol decision unit 230 for each current iteration process, $$R_{hh}^{(q+1)}$$

denotes an estimate of $$R_{hh}=E\{h_{ik}^H h_{ik}\}$$

obtained by the channel estimation unit 240 for a previous iteration process, and $$R_{vv}^{(q)}$$

denotes an estimate of $$R_{vv}=\sigma_n^2 I_{N_c}$$

obtained by the noise variance estimation unit 250 for the previous iteration process.

Since the disjoint EM channel estimation scheme considers, as interference, signals transmitted to other antennas, the channel estimation performance may be deteriorated. Therefore, the present invention proposes a method that can perform soft cancellation for an interference component caused by another antenna, based on interference estimation, to thereby improve the channel estimation performance. When mixing the disjoint channel estimation scheme and the joint channel estimation scheme, the channel estimation as shown in the following Equation 14 may be enabled, $$\hat{h}_{ik}^{(q+1)}=F_c F_c^+ [F_c^+ (\overline{S}_k^{(q+1)})^H \overline{S}_k^{(q+1)} F_c + R_{vv}^{(q)} (R_{hh}^{(q+1)})^{-1}]^{-1} (\overline{S}_k^{(q+1)})^H \overline{y}_{(i)}^{(q+1)}. \quad \text{[Equation 14]}$$

The difference between Equation 13 and Equation 14 lies in that the received signal vector $$y_{(i)}$$

is changed to $$\overline{y}_{(i)}^{(q+1)}$$

as given by, $$\overline{y}_{(i)}^{(q+1)} = y_{(i)} - \sum_{j=1, j\neq k}^{N_t} \overline{S}_j^{(q+1)} \hat{h}_{ij}^{(q)}. \quad \text{[Equation 15]}$$

In comparison to the joint channel estimation scheme, the scheme as shown in Equation 14 initially performs soft interference cancellation and then performs distribution estimation. Therefore, it is possible to reduce a computational amount while maintaining the joint estimation performance.

However, since the above scheme shown in Equation 14 requires P×P matrix inversion for each OFDM symbol, the complexity may be very large.

In order to reduce the computational amount, the present invention proposes a channel estimation scheme as given by, $$\hat{h}_{ik}^{(q+1)} = F_c F_c^+ (\overline{S}_k^{(q+1)} (\overline{S}_k^{(q+1)})^H)^{-1} (\overline{S}_k^{(q+1)})^H \overline{y}_{(i)}^{(q+1)}.$$ [Equation 16]

Here, $F_c^+$ is a fixed value at all times. Therefore, it is possible to avoid the matrix inversion by pre-calculating and storing the fixed value. Since the proposed channel estimation scheme does not require the P×P matrix inversion for each OFDM symbol, it is possible to significantly reduce the complexity.

In order to cancel soft interference in the received symbol, the soft interference cancellation units 510-1, ..., 510-n may be embodied as given by, $$\overline{y}_{(i)}^{(q+1)} = y_{(i)} - \sum_{j=1, j \neq k}^{N_t} \overline{S}_j^{(q+1)} \hat{h}_{ij}^{(q)}.$$ [Equation 17]

According to an aspect of the present invention, when it is determined no error has occurred while receiving a packet, the channel estimation unit 240 may use an errorlessly received symbol and thus it is possible to improve the channel estimation performance.

In order to estimate an initial frequency domain channel for a received symbol, the initial frequency domain channel estimation units 520-1, ..., 520-n may be embodied as given by, $$\breve{h}_{ik}^{(q+1)} = (\overline{S}_k^{(q+1)} (\overline{S}_k^{(q+1)})^H)^{-1} (\overline{S}_k^{(q+1)})^H \overline{y}_{(i)}^{(q+1)}.$$ [Equation 18]

In order to estimate a time domain channel for the received symbol, the time domain channel estimation units 530-1, ..., 530-n may be embodied as given by, $$\hat{g}_{ik}^{(q+1)} = F_c^+ \breve{h}_{ik}^{(q+1)}.$$ [Equation 19]

In order to estimate a final frequency domain channel for the received symbol, the final frequency domain channel estimation units 540-1, ..., 540-n may be embodied as given by, $$\hat{h}_{ik}^{(q+1)} = F_c \hat{g}_{ik}^{(q+1)}.$$ [Equation 20]

An iterative EM channel estimation scheme may perform soft interference cancellation to thereby reduce a computational amount. However, in the case of an initial iteration, that is, in the case q=0, $\hat{h}_{ij}^{(0)}$ does not exist and thus the soft interference cancellation using Equation 17 may be impossible. Therefore, the present invention proposes a soft interference cancellation scheme for a pilot symbol using channel estimation obtained from a previous OFDM symbol.

When $S_{P_n,j}^P$ is defined as a pilot symbol of a $j^{th}$ transmit antenna that is transmitted via a $P_n$ subcarrier and $$y_{(i)}^P = [y_{P_1,i}\ y_{P_2,i}\ \cdots\ y_{P_{N_p},i}]^T,$$

a received signal for a pilot subcarrier may be expressed as, $$y_{(i)}^p = S_k^p h_{ik}^p + \sum_{j=1, j \neq k}^{N_t} S_j^p h_{ij}^p + v_{(i)}^p.$$ [Equation 21]

where $$h_{ij}^P = [h_{P_1,ij}\ h_{P_2,ij}\ \cdots\ h_{P_{N_p},ij}]^T$$

$$S_k^P = \text{diag}(s_{P_1,k}^P, s_{P_2,k}^P, \ldots, s_{P_{N_p},k}^P)$$

$$v_{(i)}^P = [v_{P_1,k}\ v_{P_2,k}\ \cdots\ v_{P_{N_p},k}]^T.$$

When $F_P \in \mathbb{C}^{N_\bullet \times P}$ is defined as a pilot DFT matrix for CIR and $$[F_P]_{n,p} = e^{-j2\pi(n-1)(p-1)/N},$$

the relationship as shown in the following Equation 22 may be accomplished, $$h_{kj}^P = F_P g_{kj}.$$ [Equation 22]

Generally, columns of $F_P$ are not orthogonal to each other and are given by, $$F_P^\dagger F_P = I_P$$ [Equation 23]

where $F_P^+$ denotes a pseudo-inverse matrix of $F_P$.

Therefore, it is possible to induce the relationship as given by, $$g_{kj} = F_P^+ h_{kj}^P.$$ [Equation 24]

Finally, Equation 21 may be represented as, $$y_{(i)}^p = S_k^p F_P^+ g_{ik} + \sum_{j=1, j \neq k}^{N_t} S_j^p F_P^+ g_{ij} + v_{(i)}^p.$$ [Equation 25]

The present invention may cancel soft interference in the pilot symbol using the channel estimation obtained from the previous OFDM symbol, as given by, $$\overline{y}_{(i)}^p = y_{(i)}^p - \sum_{j=1, j \neq k}^{N_t} S_j^p \hat{h}_{ij}^{pre},$$ [Equation 26]

where $$h_{ij}^{pre} = \begin{bmatrix} h_{P_1,ij}^{pre} & h_{P_2,ij}^{pre} & \cdots & h_{P_{N_p},ij}^{pre} \end{bmatrix}^T$$

and $h_{p_n,ij}^{pre}$ denotes a channel estimate of $h_{p_n,ij}$ that is finally obtained from the previous OFDM symbol. A final value may be obtained from a preamble OFDM symbol.

Accordingly, the initial channel estimation using the pilot symbol may be represented as, $$\hat{h}_{ik}^{(0)} = F_e (F_p^H (S_k^p)^H S_k^p F_p)^{-1} F_p^H (S_k^p)^H \bar{y}_{(i)}^p. \quad \text{[Equation 27]}$$

Here, $(F_p^H (S_k^p)^H S_k^p F_p)^{-1}$ is a fixed value at all times. Therefore, it is possible to avoid the matrix inversion by pre-calculating and storing the fixed value.

Figure 6:
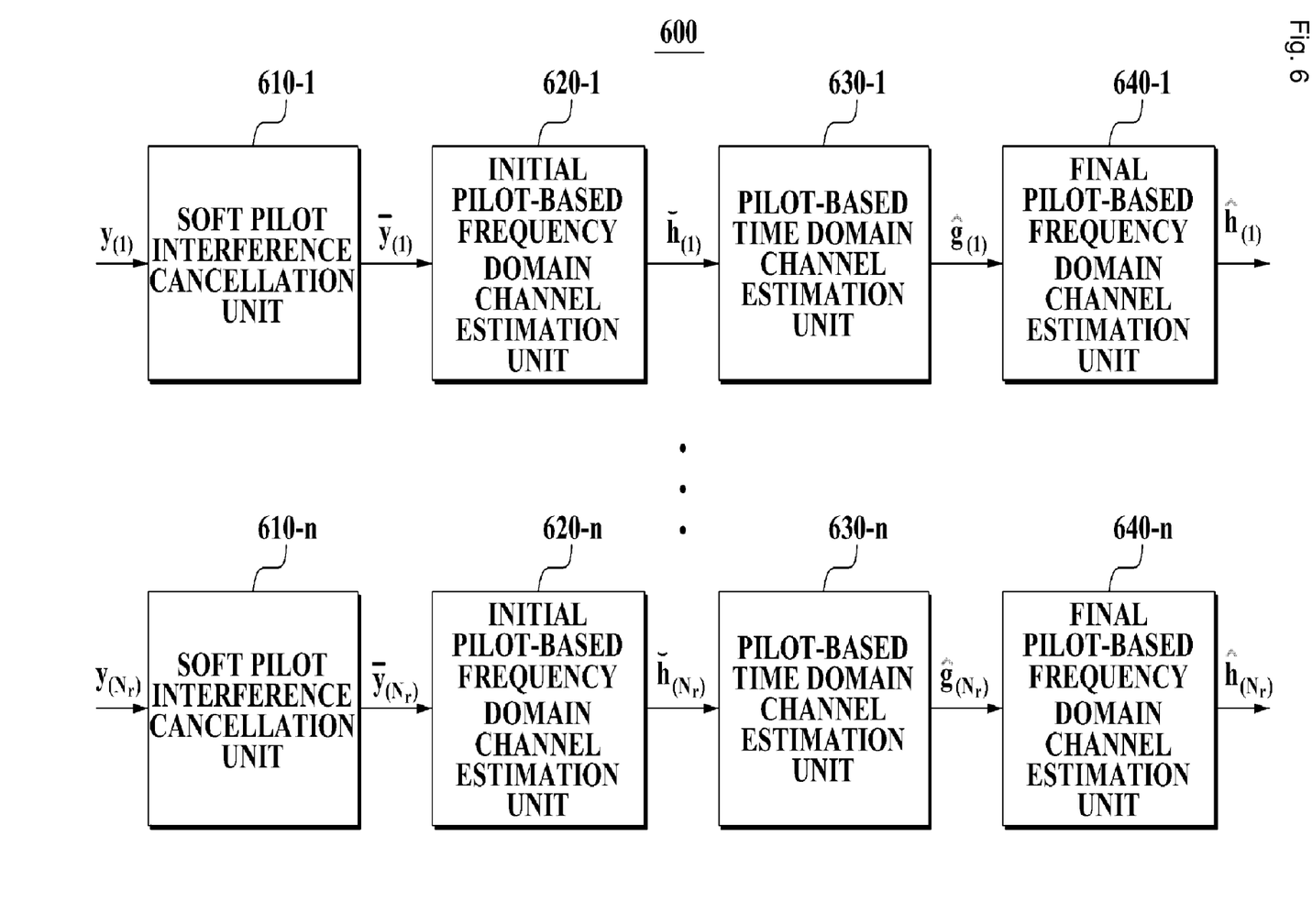
FIG. 6 is a block diagram illustrating a configuration of a channel estimation unit using a pilot symbol.

FIG. 6 is a block diagram illustrating a configuration of a channel estimation unit 600 using a pilot symbol.

Referring to FIG. 6, in order to cancel interference in the pilot symbol, soft pilot interference cancellation units 610-1, . . . , 610-n may be embodied as given by, $$\bar{y}_{(i)}^p = y_{(i)}^p - \sum_{j=1, j \neq k}^{N_t} S_j^p \hat{h}_{ij}^{pre}. \quad \text{[Equation 28]}$$

In order to estimate an initial frequency domain channel with respect to the pilot symbol, initial pilot-based frequency domain channel estimation units 620-1, . . . , 620-n may be embodied as given by, $$\check{h}_{ik}^{(0)} = (S_k^p)^H \bar{y}_{(i)}^p. \quad \text{[Equation 29]}$$

In order to estimate a time domain channel of the pilot symbol, initial pilot-based time domain channel estimation units 630-1, . . . , 630-n may be embodied as given by, $$\hat{g}_{ik}^{(0)} = (F_p^H (S_k^p)^H S_k^p F_p)^{-1} F_p^H \check{h}_{ik}^{(0)}. \quad \text{[Equation 30]}$$

In order to estimate a final frequency domain channel of the pilot symbol, final pilot-based frequency domain channel estimation units 640-1, . . . , 640-n may be embodied as given by, $$\hat{h}_{ik}^{(0)} = F_e \bar{y}_{(i)}^p \hat{g}_{ik}^{(0)}. \quad \text{[Equation 31]}$$

Figure 7:
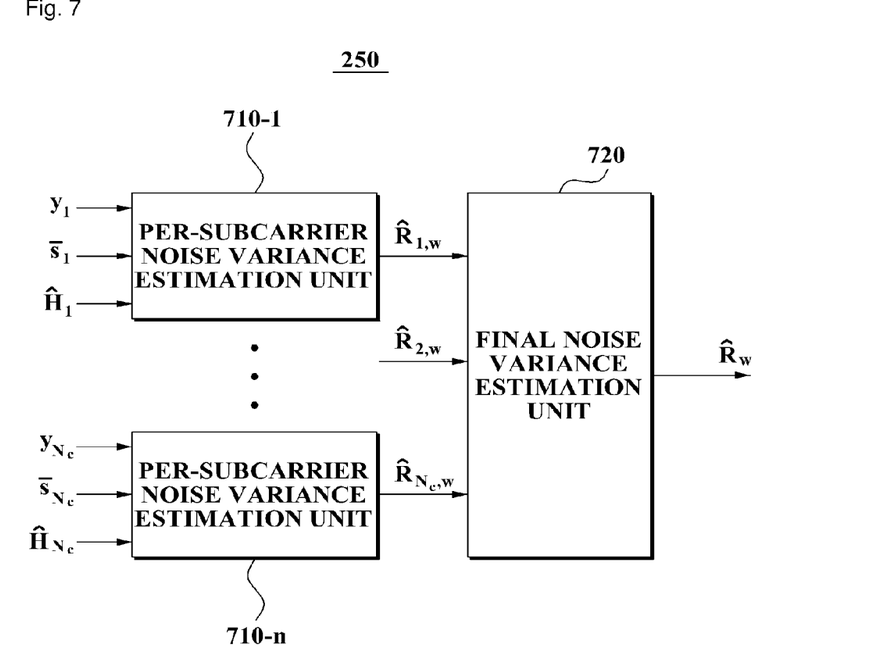
FIG. 7 is a block diagram illustrating a configuration of a noise variance estimation unit shown in FIG. 2.

FIG. 7 is a block diagram illustrating a configuration of the noise variance estimation unit 250 shown in FIG. 2.

Referring to FIG. 7, the noise variance estimation unit 250 includes per-subcarrier noise variance estimation units 710-1, . . . , 710-n and a final noise variance estimation unit 720. The noise variance estimation unit 250 may estimate $\hat{R}_{vv}^{(q+1)}$ based on output $\bar{s}^{(q+1)}$ of the tentative symbol decision unit 230, output $\hat{H}^{(q+1)}$ of the channel estimation unit 240, and the received signal Y. An estimate of $R_{vv}$ in a $(q+1)^{th}$ iteration may be given by, $$\hat{R}_{vv}^{(q+1)} = \frac{1}{N} \sum_{n=1}^{N} (y_n - \hat{H}_n^{(q+1)} \bar{s}_n^{(q+1)})(y_n - \hat{H}_n^{(q+1)} \bar{s}_n^{(q+1)})^H. \quad \text{[Equation 32]}$$

The per-subcarrier noise variance estimation units 710-1, . . . , 710-n may estimate each per-subcarrier noise variance as given by, $$\hat{R}_{n,vv}^{(q+1)} = (y_n - \hat{H}_n^{(q+1)} \bar{s}_n^{(q+1)})(y_n - \hat{H}_n^{(q+1)} \bar{s}_n^{(q+1)})^H. \quad \text{[Equation 33]}$$

Next, the final noise variance estimation unit 720 may average the variance to estimate the final noise variance, as given by, $$\hat{R}_{vv}^{(q+1)} = \frac{1}{N} \sum_{n=1}^{N} \hat{R}_{n,vv}^{(q+1)}. \quad \text{[Equation 34]}$$

Figure 8:
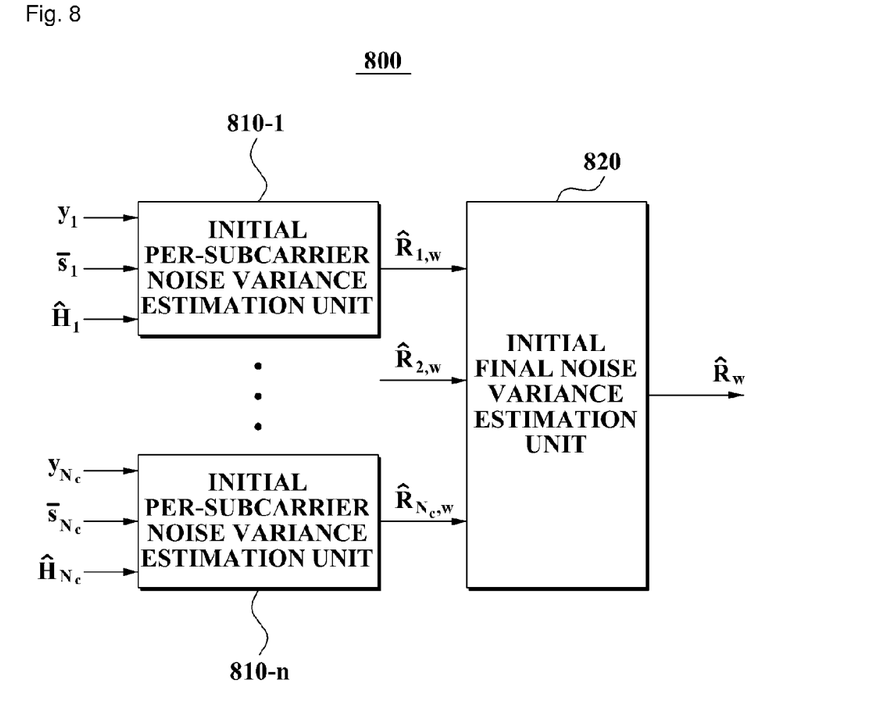
FIG. 8 is a block diagram illustrating a configuration of an initial noise variance estimation unit.

FIG. 8 is a block diagram illustrating a configuration of an initial noise variance estimation unit 800.

Referring to FIG. 8, the initial noise variance estimation unit 800 obtains an initial value of a noise variance matrix using a pilot symbol. An initial noise variance matrix may be estimated as given by, $$\hat{R}_{vv}^{(0)} = \frac{1}{N_p} \sum_{n=1}^{N_p} (y_{p_n} - \hat{H}_{p_n}^{(0)} s_{p_n}^p)(y_{p_n} - \hat{H}_{p_n}^{(0)} s_{p_n}^p)^H. \quad \text{[Equation 35]}$$

Initial per-subcarrier noise variance estimation units 810-1, . . . , 810-n may estimate each per-subcarrier noise variance of the pilot symbol as given by, $$\hat{R}_{n,vv}^{(0)} = (y_{p_n} - \hat{H}_{p_n}^{(0)} s_{p_n}^p)(y_{p_n} - \hat{H}_{p_n}^{(0)} s_{p_n}^p)^H. \quad \text{[Equation 36]}$$

An initial final noise variance estimation unit 820 may estimate the final noise variance of the pilot symbol by averaging the per-subcarrier noise variance of the pilot symbol, as given by, $$\hat{R}_{vv}^{(0)} = \frac{1}{N_p} \sum_{p_n=1}^{N_p} \hat{R}_{n,vv}^{(0)}. \quad \text{[Equation 37]}$$

As described above, according to the present invention, it is possible to provide a channel estimation scheme with similar performance to a joint channel estimation scheme and with lower complexity due to not requiring a matrix inversion, in a MIMO OFDM system.

Also, according to the present invention, it is possible to perform soft interference cancellation based on a value, estimated in a previous OFDM symbol, in an initial channel estimation stage and thereby improve the channel estimation performance and reduce the complexity.

Also, according to the present invention, it is possible to improve the performance of interference noise variance estimation based on all the information associated with previous effective subcarriers when estimating noise variance in a MIMO OFDM system.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A reception apparatus comprising:
   a detection unit configured to detect extrinsic information based on an output of a tentative symbol decision unit, an output of a channel estimation unit, and an output of a noise variance estimation unit that are obtained from a previous iteration process;
   a Cyclic Redundancy Check (CRC) aided channel decoding unit configured to output an encoded and interleaved bit, or a posteriori information thereof based on the extrinsic information;
   the tentative symbol decision unit configured to determine a tentative transmission symbol based on an output of the CRC aided channel decoding unit;
   the channel estimation unit configured to estimate a channel based on an output of the tentative symbol decision unit or a pilot symbol; and
   the noise variance estimation unit configured to estimate a noise variance or an initial noise variance based on the output of the tentative symbol decision unit and the output of the channel estimation unit.

2. The reception apparatus of claim 1, wherein the CRC aided channel decoding unit comprises:
   a deinterleaving unit configured to receive a bit extrinsic log-likelihood ratio (LLR) from the detection unit and to deinterleave the received bit extrinsic LLR to generate a priori LLR of a channel decoding unit;
   the channel decoding unit configured to decode the priori LLR to output a transmission information bit extrinsic LLR and a posteriori LLR of an encoded bit;
   a CRC checking unit configured to check the transmission information bit extrinsic LLR to determine whether an error has occurred while receiving a packet;
   an encoding unit configured to encode a received information bit corresponding to an output of the CRC checking unit; and
   an interleaving unit configured to interleave the encoded bit or the posteriori LLR thereof to generate a priori LLR of the tentative symbol decision unit.

3. The reception apparatus of claim 1, wherein the tentative symbol decision unit comprises:
   a decision selection unit configured to select any one scheme from tentative symbol decision schemes;
   a pilot replacement unit configured to replace a tentative symbol decision with a pilot symbol when the transmission symbol is the pilot symbol;
   a hard decision unit configured to map a received encoded bit corresponding to an output of the CRC checking unit to determine a tentative symbol, when it is determined no error has occurred while receiving a packet; and
   a soft decision unit configured to determine the tentative symbol with respect to the transmission symbol based on a posteriori LLR of the interleaved bit corresponding to an output of the channel decoding unit, when it is determined the error has occurred.

4. The reception apparatus of claim 1, wherein the channel estimation unit comprises:
   a soft interference cancellation unit configured to cancel an interference component based on a channel estimation obtained from the previous iteration process and a tentative symbol decision;
   an initial frequency domain channel estimation unit configured to estimate an initial frequency domain channel based on a received signal and the tentative symbol decision;
   a time domain channel estimation unit configured to estimate a time domain channel based on the estimated initial frequency domain channel; and
   a final frequency domain channel estimation unit configured to estimate a final frequency domain channel based on the estimated time domain channel.

5. The reception apparatus of claim 1, wherein the channel estimation unit comprises:
   a soft pilot interference cancellation unit configured to cancel a pilot interference component based on a pilot symbol and a channel estimation that is obtained from a previous orthogonal frequency division multiplexing (OFDM) symbol;
   an initial pilot-based frequency domain channel estimation unit configured to estimate an initial pilot-based frequency domain channel based on a received pilot signal and the pilot symbol;
   a pilot-based time domain channel estimation unit configured to estimate a pilot-based time domain channel based on the estimated initial pilot-based frequency domain channel; and
   a final pilot-based frequency domain channel estimation unit configured to estimate a final pilot-based frequency domain channel based on the estimated pilot-based time domain channel.

6. The reception apparatus of claim 1, wherein the noise variance estimation unit comprises:
   a per-subcarrier noise variance estimation unit configured to estimate a per-subcarrier noise variance based on a received signal, a tentative symbol decision, and a channel estimation obtained from the previous iteration process; and
   a final-noise variance estimation unit configured to average the estimated per-subcarrier noise variance to estimate a final noise variance.

7. The reception apparatus of claim 1, wherein the noise variance estimation unit comprises:
   a initial per-subcarrier noise variance estimation unit configured to estimate a pilot per-subcarrier noise variance based on a received pilot signal, a pilot symbol, and a channel estimation obtained from the previous iteration process; and
   an initial final noise variance estimation unit configured to average the estimated pilot per-subcarrier noise variance to estimate a final pilot noise variance.

8. A reception method comprising, for a signal received by at least one antenna:
   detecting extrinsic information based on a tentative symbol decision, a channel estimation, and a noise variance estimation that are obtained from a previous iteration process;
   outputting an encoded and interleaved bit or a posteriori information thereof based on the extrinsic information;
   determining a tentative transmission symbol based on the outputting;
   estimating a channel based on a tentative symbol decision or a pilot symbol; and
   estimating a noise variance or an initial noise variance based on the tentative symbol decision and the channel estimation.

9. The method of claim 8, wherein the determining of the tentative transmission symbol comprises:

selecting any one scheme from tentative symbol decision schemes;

replacing the tentative symbol decision with a pilot symbol when the transmission symbol is the pilot symbol;

mapping a received encoded bit to determine a tentative symbol, when it is determined no error has occurred while receiving a packet; and determining the tentative symbol with respect to the transmission symbol based on a posteriori LLR of the interleaved bit, when it is determined the error has occurred.

10. The method of claim 8, wherein the estimating of the channel comprises:

canceling an interference component based on the channel estimation obtained from the previous iteration process and the tentative symbol decision;

estimating an initial frequency domain channel based on a received signal and the tentative symbol decision;

estimating a time domain channel based on the estimated initial frequency domain channel; and estimating a final frequency domain channel based on the estimated time domain channel.

11. The method of claim 8, wherein the estimating of the channel comprises:

canceling a pilot interference component based on a pilot symbol and a channel estimation that is obtained from a previous OFDM symbol;

estimating an initial pilot-based frequency domain channel based on a received pilot signal and the pilot symbol;

estimating a pilot-based time domain channel based on the estimated initial pilot-based frequency domain channel; and estimating a final pilot-based frequency domain channel based on the estimated pilot-based time domain channel.

12. The method of claim 8, wherein the estimating of the noise variance comprises:

estimating a per-subcarrier noise variance based on a received signal, the tentative symbol decision, and the channel estimation obtained from the previous iteration process; and averaging the estimated per-subcarrier noise variance to estimate a final noise variance.

13. The method of claim 8, wherein the estimating of the noise variance comprises:

estimating an initial per-subcarrier noise variance based on a received pilot symbol, a pilot symbol, and the channel estimation obtained from the previous iteration process; and averaging the estimated initial per-subcarrier noise variance to estimate an initial final pilot noise variance.

* * * * *